L. T. BICKERS & T. J. LEE.
COTTON TOPPER.
APPLICATION FILED OCT. 14, 1908.
951,796.
Patented Mar. 15, 1910.
2 SHEETS—SHEET 1.
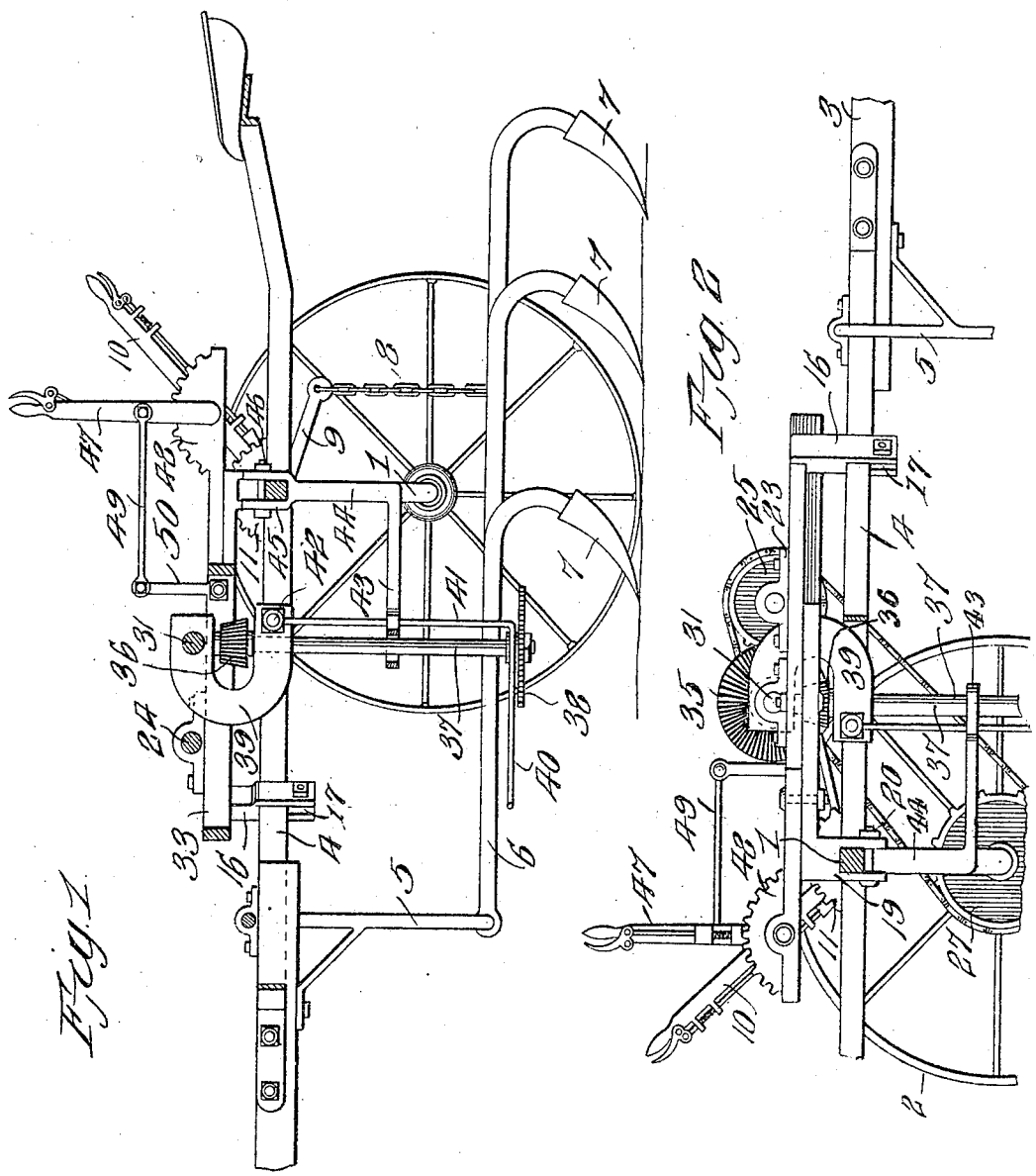
Witnesses
Frank Hough
R. M. Smith
Inventors
Lucius T. Bickers,
Thomas J. Lee
By Victor J. Evans
Attorney

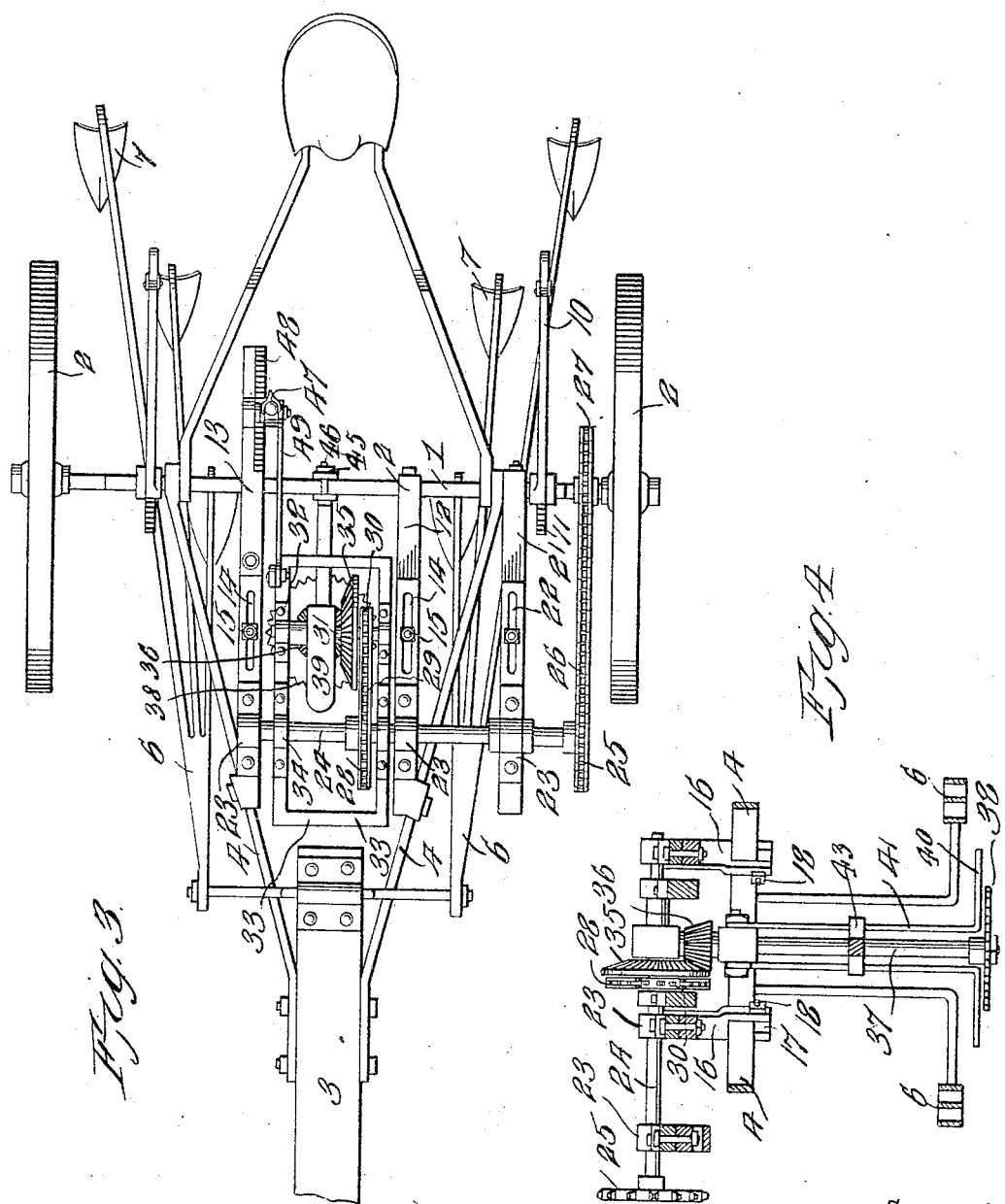

UNITED STATES PATENT OFFICE.

LUCIUS T. BICKERS AND THOMAS J. LEE, OF MOODY, TEXAS.

COTTON-TOPPER.

951,796.  Specification of Letters Patent.  Patented Mar. 15, 1910.

Application filed October 14, 1908. Serial No. 457,690.

*To all whom it may concern:*

Be it known that we, LUCIUS T. BICKERS and THOMAS J. LEE, citizens of the United States, residing at Moody, in the county of McLennan and State of Texas, have invented new and useful Improvements in Cotton-Toppers, of which the following is a specification.

This invention relates to cotton toppers, the object of the invention being to produce a machine adapted for the purpose of topping cotton on fertile land where weeds are prevalent and detrimental to the crop, the machine being in the nature of an attachment adapted to be fastened to the frame of an ordinary cultivator or plow and to be used, when desired, while plowing the ground, the power for driving the operative elements of the machine being derived from one of the ground or carrying wheels of the cultivator or wheeled plow.

A further object of the invention is to provide simple, convenient and effective means for regulating and varying the elevation of the cutting elements of the attachment in accordance with the condition of the crop.

With the above and other objects in view, the invention consists in the novel construction, combination and arrangement of parts as herein fully described, illustrated and claimed.

In the accompanying drawings:—Figure 1 is a vertical longitudinal section through a cotton topper embodying the present invention showing the same applied to and mounted upon the frame of an ordinary cultivator. Fig. 2 is a similar view looking from the opposite side. Fig. 3 is a plan view of the same. Fig. 4 is a vertical cross section through the machine.

The frame of the cultivator is clearly shown in Figs. 1, 2 and 3, wherein 1 designates the main cultivator axle, 2 the carrying wheels, 3 the draft pole or tongue and 4 the hounds which extend from the tongue to the axle. The frame also comprises the depending beam hanger 5 to which the cultivator beams 6 are connected and upon which they are adapted to swing as shown, each of said beams, being branched and adapted to carry a plurality of plows or shovels 7. The cultivator is also shown as comprising means for raising and lowering the beams 6 and the shovels carried thereby, the said means embodying chains 8 connected to lever arms 9 on a plurality of thumb latch levers 10 engaging rack segments 11 secured to the frame of the cultivator.

In carrying out the present invention, we employ a pair of longitudinally extensible frame bars 12 and 13 each of which is composed of relatively slidable or overlapping sections one of which is slotted as shown at 14 to receive a clamping bolt 15 which is carried by the other overlapping section whereby the said side bars 12 and 13 may be extended longitudinally to accommodate said bars to permit of varying widths and lengths. The said bars are provided at their forward ends with depending clamps 16 which are slotted as shown at 17 to fit over the hounds 4, being secured fixedly to the hounds by clamping bolts 18 as illustrated in Figs. 1, 2 and 4. At their rear ends the side bars 12 and 13 are provided with similar clamps 19 adapted to fit down over the axle 1 and to be held in place by means of clamping bolts 20. In addition to the bars 12 and 13 there is another longitudinal bar 21 which is also made extensible by means of a bolt and slot connection as shown at 22 and these bars 12, 13 and 21 are provided with bearings 23 in which is journaled a cutter driving shaft 24. This shaft extends parallel to the axle 1 and is provided with a sprocket wheel 25 from which a drive chain 26 passes around a sprocket wheel 27 receiving its motion from the carrying wheel 2. The shaft 24 also carries a second sprocket wheel 28 from which a drive chain 29 extends around a sprocket chain 30 on a short counter-shaft 31 parallel to the shaft 24 and mounted in bearings 32 on a tilting frame 33 which is journaled on the shaft 24, being provided with bearings 34 through which said shaft 24 passes. On the same shaft 31 there is mounted fast a bevel gear wheel 35 which meshes with a pinion 36 on the upper end of a vertical cutter shaft 37 on the lower end of which is mounted a rotary cutter 38 resembling a circular saw, rotary motion being imparted to the cutter 38 by the gearing just hereinabove described. In order to keep the driving gearing in perfect working order while attempting the up and down adjustment of the rotary cutter 38, we provide a bearing yoke 39, the lower arm of which is provided with a bearing for the cutter shaft 37 while the upper arm is provided with a bearing for the shaft 31. Thus the gearing wheels 35 and 36 are maintained in operative relation at all times. By reason of the fact that the tilting frame 33 is journaled on the shaft 24 upon which it swings as its center, the drive chain 29 is maintained in operative relation to the sprocket wheels 28 and 30 irrespective of the elevation to which the rotary cutter is adjusted.

Secured to the bearing yoke 39 is a pair of gathering fingers 40 which lie just over the rotary cutter 38 and diverge in a forward direction so as to gather in the tops of the cotton plants preparatory to the action of the rotary cutter 38 thereon. Each of said fingers 40 is provided with an upwardly extending shank 41 which is secured to the bearing yoke as shown at 42.

43 designates a brace which embraces the cutter shaft 37 at a point between the yoke 39 and the rotary cutter 38, said brace having an upstanding arm 44 which is bifurcated as shown at 45 to embrace the axle and which is securely fastened thereto by one or more bolts as shown at 46.

The means for tilting the frame 33 for the purpose of moving the rotary cutter and the gathering fingers up and down embodies a cutter adjusting hand lever 47 provided with a thumb latch in engagement with the rack segment 48. The lever 47 is provided with a laterally extending arm 49 pivotally secured to said lever and from the extremity of the arm 49 a pivotal link 50 extends to and connects with a tilting frame 33 so that when the lever 47 is moved backward and forward it has the effect of correspondingly elevating and depressing the forward end of the tilting frame and correspondingly lowering and raising the rotary cutter 38 to bring the latter to the proper elevation for severing the tops of the plants.

We claim:—

A cotton topper attachment for cultivators comprising a stationary frame embodying side bars, clamping means for securing said side bars to the cultivator frame adapting the attachment as a whole to be clamped to the frame of a cultivator, a tilting frame pivotally supported between the side bars of the stationary frame, means for tilting said frame, a topper shaft extending from the tilting frame downwardly, a counter shaft journaled in the tilting frame and geared to the topper shaft, and a revolving circular topping cutter mounted on the lower end of said topper shaft.

In testimony whereof we affix our signatures in presence of two witnesses.

LUCIUS T. BICKERS.
THOMAS J. X LEE.
his
mark

Witnesses:
A. H. CARNES,
W. A. TAYLOR.